United States Patent
Chiu et al.

(10) Patent No.: US 12,197,056 B2
(45) Date of Patent: Jan. 14, 2025

(54) ELECTRONIC DEVICE AND MANUFACTURING METHOD THEREOF

(71) Applicant: InnoLux Corporation, Miao-Li County (TW)

(72) Inventors: Sheng-Hui Chiu, Miao-Li County (TW); Kuo-Jung Fan, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 0 days.

(21) Appl. No.: 18/415,998

(22) Filed: Jan. 18, 2024

(65) Prior Publication Data

US 2024/0288719 A1 Aug. 29, 2024

(30) Foreign Application Priority Data

Feb. 23, 2023 (CN) .......................... 202310155497.3

(51) Int. Cl.
*G02F 1/13* (2006.01)
*G02F 1/1333* (2006.01)
*G02F 1/1335* (2006.01)

(52) U.S. Cl.
CPC ...... *G02F 1/1323* (2013.01); *G02F 1/133368* (2021.01); *G02F 1/133528* (2013.01)

(58) Field of Classification Search
CPC ............. G02F 1/1323; G02F 1/133368; G02F 1/133528
USPC .......................................................... 349/12
See application file for complete search history.

(56) References Cited

U.S. PATENT DOCUMENTS

| | | | | |
|---|---|---|---|---|
| 6,812,974 B1* | 11/2004 | Hinata | ................ | G02F 1/13338 349/158 |
| 2005/0099402 A1* | 5/2005 | Nakanishi | ........... | G06F 3/04164 345/173 |
| 2010/0110326 A1* | 5/2010 | Isobe | .................... | G02F 1/1323 349/58 |
| 2013/0154977 A1* | 6/2013 | Lee | ................... | G02F 1/133528 445/24 |
| 2013/0188103 A1* | 7/2013 | Jeng | .................... | G02F 1/13338 345/173 |

FOREIGN PATENT DOCUMENTS

CN 114613919 A 6/2022
TW 201827894 A 8/2018

\* cited by examiner

*Primary Examiner* — Charles S Chang
(74) *Attorney, Agent, or Firm* — MUNCY, GEISSLER, OLDS & LOWE, P.C.

(57) ABSTRACT

An electronic device includes a display panel and a viewing angle switchable panel disposed on the display panel. The display panel includes: a first substrate; a second substrate disposed opposite to the first substrate; and a display medium layer disposed between the first substrate and the second substrate. The viewing angle switchable panel is provided with: a third substrate; a fourth substrate disposed opposite to the third substrate; and a switching medium layer disposed between the third substrate and the fourth substrate. At least one of the third substrate and the fourth substrate has a thickness of 5 μm to 50 μm.

17 Claims, 5 Drawing Sheets

ELECTRONIC DEVICE AND MANUFACTURING METHOD THEREOF

CROSS-REFERENCE TO RELATED APPLICATIONS

This application claims the benefits of the Chinese Patent Application Serial Number 202310155497.3, filed on Feb. 23, 2023, the subject matter of which is incorporated herein by reference.

BACKGROUND

Field of the Disclosure

The present disclosure relates to an electronic device and a manufacturing method thereof and, more particularly, to an electronic device with thinness and light weight and a manufacturing method thereof.

Description of Related Art

With the advancement of electronic device technology, most electronic products today are developing to be highly integrated; that is, a single electronic device can be provided with multiple functions, such as display, touch, privacy and so on. In addition, in order to meet consumer demand, electronic devices must also be thinner and lighter. However, when an electronic device is equipped with more and more functions, it is disadvantageous in making the electronic device thin or lightweight.

Therefore, there is an urgent need to provide an electronic device and a manufacturing method thereof so that the electronic device can be thinned or lightweight.

SUMMARY

The present disclosure provides an electronic device, which comprises: a display panel including: a first substrate; a second substrate disposed opposite to the first substrate; and a display medium layer disposed between the first substrate and the second substrate; and a viewing angle switchable panel disposed on the display panel and provided with: a third substrate; a fourth substrate disposed opposite to the third substrate; and a switching medium layer disposed between the third substrate and the fourth substrate, wherein at least one of the third substrate and the fourth substrate has a thickness of 5 μm to 50 μm.

The present disclosure further provides a manufacturing method of an electronic device, which comprises the steps of: providing a display panel, in which the display panel includes a first substrate; a second substrate disposed opposite to the first substrate; and a display medium layer disposed between the first substrate and the second substrate; providing a viewing angle switchable panel, in which the viewing angle switchable panel includes a third substrate; a fourth substrate disposed opposite to the third substrate; and a switching medium layer disposed between the third substrate and the fourth substrate; and bonding the display panel and the viewing angle switchable panel together to form the electronic device, wherein at least one of the third substrate and the fourth substrate has a thickness of 5 μm to 50 μm. The viewing angle switchable panel is manufactured through the steps of: providing a first carrier substrate; forming the third substrate on the first carrier substrate by a coating method so as to form a first substrate structure; combining the first substrate structure and the fourth substrate correspondingly, and forming the switching medium layer between the third substrate and the fourth substrate; and separating the first carrier substrate and the third substrate in the first substrate structure to form the viewing angle switchable panel.

Other novel features of the disclosure will become more apparent from the following detailed description when taken in conjunction with the accompanying drawings.

DETAILED DESCRIPTION OF EMBODIMENT

Figure 1:
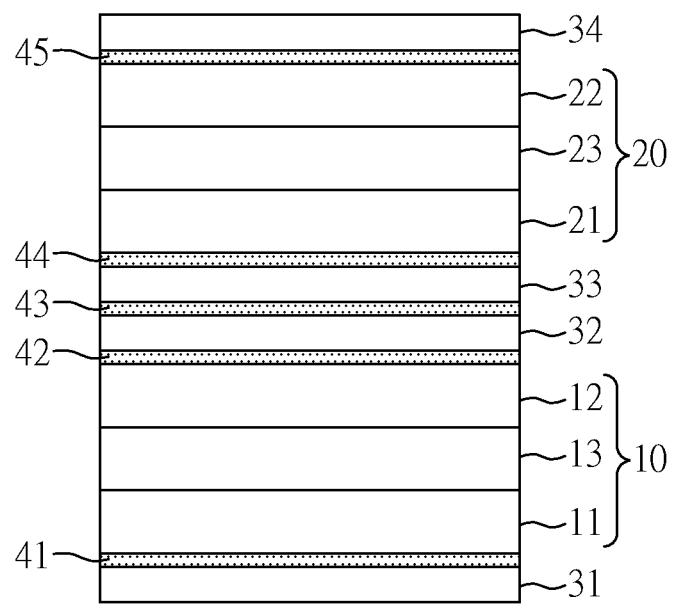
FIG. 1 is a schematic diagram of an electronic device according to an embodiment of the present disclosure.

The implementation of the present disclosure is illustrated by specific embodiments to enable persons skilled in the art to easily understand the other advantages and effects of the present disclosure by referring to the disclosure contained therein. The present disclosure is implemented or applied by other different, specific embodiments. Various modifications and changes can be made in accordance with different viewpoints and applications to details disclosed herein without departing from the spirit of the present disclosure.

It should be noted that, in the specification and claims, unless otherwise specified, having "one" element is not limited to having a single said element, but one or more said elements may be provided. Furthermore, in the specification and claims, unless otherwise specified, ordinal numbers, such as "first", "second", etc., used herein are intended to distinguish elements rather than disclose explicitly or implicitly that names of the elements bear the wording of the ordinal numbers. The ordinal numbers do not imply what order an element and another element are in terms of space, time or steps of a manufacturing method.

In the entire specification and the appended claims of the present disclosure, certain words are used to refer to specific components. Those skilled in the art should understand that electronic device manufacturers may refer to the same components by different names. The present disclosure does not intend to distinguish those components with the same function but different names. In the claims and the following description, the words "comprise", "include" and "have" are open type language, and thus they should be interpreted as meaning "including but not limited to . . . ". Therefore, when the terms "comprise", "include" and/or "have" are used in the description of the present disclosure, they specify the existence of corresponding features, regions, steps, operations and/or components, but do not exclude the existence of one or more corresponding features, regions, steps, operations and/or components.

In the description, the terms "almost", "about", "approximately" or "substantially" usually means within 10%, 5%, 3%, 2%, 1% or 0.5% of a given value or range. The quantity given here is an approximate quantity; that is, without specifying "almost", "about", "approximately" or "substantially", it can still imply the meaning of "almost", "about", "approximately" or "substantially". In addition, the term "range of the first value to the second value" or "range between the first value and the second value" indicates that the range includes the first value, the second value, and other values in between.

Unless otherwise defined, all terms (including technical and scientific terms) used here have the same meanings as commonly understood by those skilled in the art of the present disclosure. It is understandable that these terms, such as those defined in commonly used dictionaries, should be interpreted as having a meaning consistent with the relevant technology and the background or context of the present disclosure, rather than in an idealized or excessively formal interpretation, unless specifically defined.

In addition, relative terms such as "below" or "bottom", and "above" or "top" may be used in the embodiments to describe the relationship between one component and another component in the drawing. It can be understood that, if the device in the drawing is turned upside down, the components described on the "lower" side will become the components on the "upper" side. When the corresponding member (such as a film or region) is described as "on another member", it may be directly on the other member, or there may be other members between the two members. On the other hand, when a member is described as "directly on another member", there is no member between the two members. In addition, when a member is described as "on another member", the two members have a vertical relationship in the top view direction, and this member may be above or below the other member, while the vertical relationship depends on the orientation of the device.

In the present disclosure, the measurement method of thickness may be obtained by using an optical microscope, and the thickness may be obtained by measuring the cross-sectional image in an electron microscope, but it is not limited thereto. In addition, any two values or directions used for comparison may have certain errors. If the first value is equal to the second value, it implies that there may be an error of about 10% between the first value and the second value. If the first direction is perpendicular to the second direction, the angle between the first direction and the second direction may be in a range of 80 to 100 degrees. If the first direction is parallel to the second direction, the angle between the first direction and the second direction may be in a range of 0 to 10 degrees.

It should be noted that the technical solutions provided by the different embodiments described hereinafter may be used interchangeably, combined or mixed to form another embodiment without violating the spirit of the present disclosure.

FIG. 1 is a schematic diagram of an electronic device according to an embodiment of the present disclosure.

In one embodiment of the present disclosure, as shown in FIG. 1, the electronic device may include: a display panel 10; and a viewing angle switchable panel 20 disposed on the display panel 10. The display panel may include: a first substrate 11; a second substrate 12 disposed opposite to the first substrate 11; and a display medium layer 13 disposed between the first substrate 11 and the second substrate 12. The viewing angle switchable panel 20 may include a third substrate 21; a fourth substrate 22 disposed opposite to the third substrate 21; and a switching medium layer 23 disposed between the third substrate 21 and the fourth substrate 22.

In the present disclosure, the first substrate 11, the second substrate 12, the third substrate 21 and the fourth substrate 22 may be manufactured using the same or different materials. The materials of the substrate 21 and the fourth substrate 22 may each include glass, quartz, sapphire, ceramics, polycarbonate (PC), polyimide (PI), and polyethylene terephthalate (PET), polymethylmethacrylate (PMMA), other suitable substrate materials or a combination thereof, but the present disclosure is not limited thereto. In the present disclosure, the thicknesses of the first substrate 11, the second substrate 12, the third substrate 21 and the fourth substrate 22 may each be 5 μm to 10000 μm, such as, 5 μm to 25 μm, 5 μm to 50 μm, 5 μm to 100 μm, 5 μm to 200 μm, 5 μm to 300 μm, 5 μm to 500 μm, 5 μm to 1000 μm, 10 μm to 25 μm, 10 μm to 50 μm, 10 μm to 100 μm, 10 μm to 200 μm or 100 μm to 1000 μm, but the present disclosure is not limited thereto. By designing the range of substrate thickness, the present disclosure may achieve the purpose of thinness or light weight for the electronic devices. In one embodiment of the present disclosure, the thickness of at least one of the third substrate 21 and the fourth substrate 22 is 5 μm to 100 μm, such as 5 μm to 50 μm. In one embodiment of the present disclosure, the thickness of each of the third substrate 21 and the fourth substrate 22 is 5 μm to 100 μm, such as 5 μm to 50 μm. In one embodiment of the present disclosure, the thickness of at least one of the first substrate 11 and the second substrate 12 is 5 μm to 100 μm, such as 5 μm to 50 μm. In one embodiment of the present disclosure, the thickness of each of the second substrate 12 and the third substrate 21 is 5 μm to 100 μm, such as 5 μm to 50 μm.

In the present disclosure, the display medium layer 13 may include liquid crystals (LC), quantum dots (QD), fluorescent molecules, phosphors, organic light emitting diodes (OLED), sub-millimeter light emitting diode (mini LED), micro light emitting diode (micro LED), quantum dot light emitting diode (QLED or QD-LED), or a combination thereof, but the present disclosure is not limited thereto.

In the present disclosure, the switching medium layer 23 may include guest host type liquid crystal (GHLC), dye liquid crystal, twisted nematic liquid crystal (TN LC), super twisted nematic liquid crystal (STN LC), polymer dispersed liquid crystal (PDLC), polymer network liquid crystal (PNLC), cholesteric texture liquid crystal, polymer-stabilized cholesteric texture liquid crystal (PSCT LC), suspended particle material (SPD), electrochromic materials, etc., or a combination thereof, but the present disclosure is not limited thereto.

In the present disclosure, the electronic device may further include a polarizer. As shown in FIG. 1, the electronic device may include, for example, a first polarizer 31, a second polarizer 32, a third polarizer 33, and a fourth polarizer 34. The display panel 10 may be disposed between the first polarizer 31 and the second polarizer 32, and the viewing angle switchable panel 20 may be disposed between the third polarizer 33 and the fourth polarizer 34. The second polarizer 32 and the third polarizer 33 may be disposed between the display panel 10 and the viewing angle switchable panel 20. In one embodiment of the present disclosure, although not shown in the figure, the second polarizer 32 or the third polarizer 33 may be selectively disposed between the display panel 10 and the viewing angle switchable panel 20. In other words, the electronic device may be selectively not provided with the second polarizer 32 or the third polarizer 33, so that the electronic device may be made thin or lightweight.

In the present disclosure, the electronic device may further include adhesive layers 41, 42, 43, 44 and 45. More specifically, as shown in FIG. 1, the adhesive layer 41 may be disposed between the first polarizer 31 and the first substrate 11, the adhesive layer 42 may be disposed between the second substrate 12 and the second polarizer 32, the adhesive layer 43 may be disposed between the second polarizer 32 and the third polarizer 33, the adhesive layer 44 may be disposed between the third polarizer 33 and the third substrate 21, and the adhesive layer 45 may be disposed between the fourth substrate 22 and the fourth polarizer 34. The polarizer may be bonded to the substrate or another polarizer through an adhesive layer to form the electronic device of the present disclosure. In one embodiment of the present disclosure, the adhesive layer (e.g., adhesive layers 42, 43 and 44) may be disposed between the display panel 10 and the viewing angle switchable panel 20. In the present disclosure, the materials of the adhesive layers 41, 42, 43, 44 and 45 are not limited, and may be, for example, glass glue, optical glue, silicone glue, tape, hot melt glue, AB glue, two-component adhesive, polymer glue or a combination thereof, but the present disclosure is not limited thereto.

In addition, in one embodiment of the present disclosure, although not shown in the figure, when the display panel 10 is such a display panel that requires a backlight (e.g., a liquid crystal display panel), the electronic device of the present disclosure may further include a backlight module, which is disposed below the display panel 10, wherein the display panel 10 is disposed between the backlight module and the viewing angle switchable panel 20. The backlight module may include a backlight source, a light guide plate, an optical film, a backlight frame, other elements, or a combination thereof, but the present disclosure is not limited thereto.

In the present disclosure, since the electronic device may include the display panel 10, it may be applied to any electronic device that needs a display screen, such as a monitor, a mobile phone, a laptop, a video camera, a still camera, a music player, a mobile navigator, a television set and other electronic devices that display images, but the present disclosure is not limited thereto.

Figure 2:
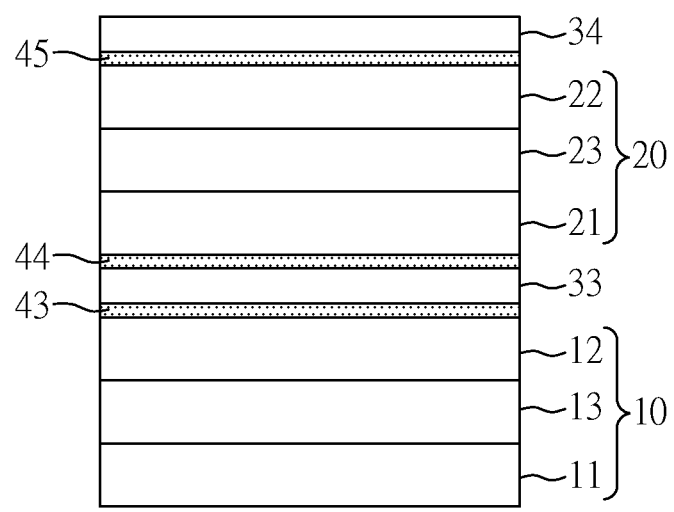
FIG. 2 is a schematic diagram of an electronic device according to another embodiment of the present disclosure.

FIG. 2 is a schematic diagram of an electronic device according to another embodiment of the present disclosure. The electronic device of FIG. 2 is similar to that of FIG. 1 except for the following differences.

In the present disclosure, when the display medium layer 13 of the display panel 10 includes, for example, an organic light emitting diode (OLED) or a light emitting diode (LED), the electronic device may not be provided with the first polarizer 31 and the second polarizer 32, so as to achieve the purpose of thinness and light weight for the electronic device. More specifically, as shown in FIG. 2, the electronic device of the present disclosure may include, for example, a third polarizer 33 and a fourth polarizer 34, wherein the third polarizer 33 is disposed between the display panel 10 and the viewing angle switchable panel 20, the fourth polarizer 34 is disposed on the fourth substrate 22. The third polarizer 33 and the fourth polarizer 34 may be respectively bonded to the second substrate 12, the third substrate 21 or the fourth substrate 22 through adhesive layers (such as the adhesive layers 43, 44 and 45). More specifically, the third polarizers 33 may be bonded to the second substrate 12 through the adhesive layer 43, the third polarizer 33 may be bonded to the third substrate 21 through the adhesive layer 44, and the fourth polarizer 34 may be bonded to the fourth substrate 22 through the adhesive layer 45.

Figure 3:
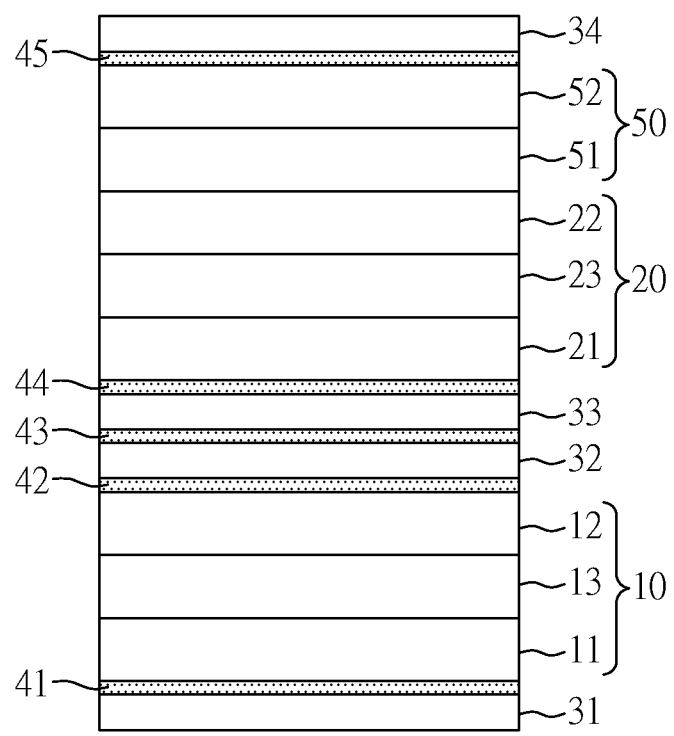
FIG. 3 is a schematic diagram of an electronic device according to still another embodiment of the present disclosure.

FIG. 3 is a schematic diagram of an electronic device according to still another embodiment of the present disclosure. The electronic device of FIG. 3 is similar to that of FIG. 1 except for the following differences.

In the present disclosure, as shown in FIG. 3, the electronic device may further include a touch sensing layer 52 disposed on the viewing angle switchable panel 20. More specifically, the touch sensing layer 52 may be disposed on a substrate 51 to form an out-cell touch sensing panel 50, and the out-cell touch sensing panel 50 may be disposed on the viewing angle switchable panel 20. In addition, the fourth polarizer 34 may be bonded to the on-cell touch sensing panel 50 through the adhesive layer 45. In another embodiment of the present disclosure, although not shown, the touch sensing layer 52 may also be directly disposed on the fourth substrate 22 (that is, the substrate 51 is omitted) so as to form an on-cell touch sensing panel.

In the present disclosure, the material of the substrate 51 may be as described for the first substrate 11, which will not be repeatedly described here. In addition, in the present disclosure, although not shown in the figure, the touch sensing layer 52 may include elements such as touch sensing units, touch electrodes, wires, etc., but the present disclosure is not limited thereto.

Figure 4:
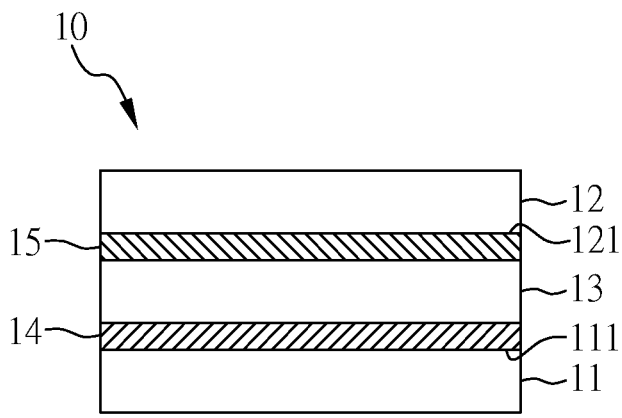
FIG. 4 is a schematic diagram of a display panel according to an embodiment of the present disclosure.

FIG. 4 is a schematic diagram of a display panel according to an embodiment of the present disclosure. In FIG. 4, a liquid crystal display panel is taken as an example, that is, the display medium layer 13 includes liquid crystals, but the present disclosure is not limited thereto. In other embodiments of the disclosure, the display panel 10 may also be an organic light emitting diode display panel, inorganic light emitting diode display panel, or other display panels.

In one embodiment of the present disclosure, as shown in FIG. 4, the display panel 10 may include a first substrate 11; a second substrate 12 disposed opposite to the first substrate 11; and a display layer 14 disposed on the inner surface 111 of the first substrate 11; a color filter layer 15 disposed on the inner surface 121 of the second substrate 12; and a display medium layer 13 disposed between the display layer 14 and the color filter layer 15.

In the present disclosure, the materials of the first substrate 11, the second substrate 12 and the display medium layer 13 may be as described above, and will not be repeatedly described here. In the present disclosure, although not shown in the figure, the display layer 14 may include driving elements, display units, wires, alignment films, other elements or a combination thereof. The color filter layer 15 may include a black matrix layer, color filter units, electrodes, alignment films, other elements, or a combination thereof. In addition, in another embodiment of the present disclosure, although not shown in the figure, the display layer 14 and the color filter layer 15 may both be disposed on the first substrate 11 to form a thin film transistor substrate integrated with a color filter array.

Figure 5:
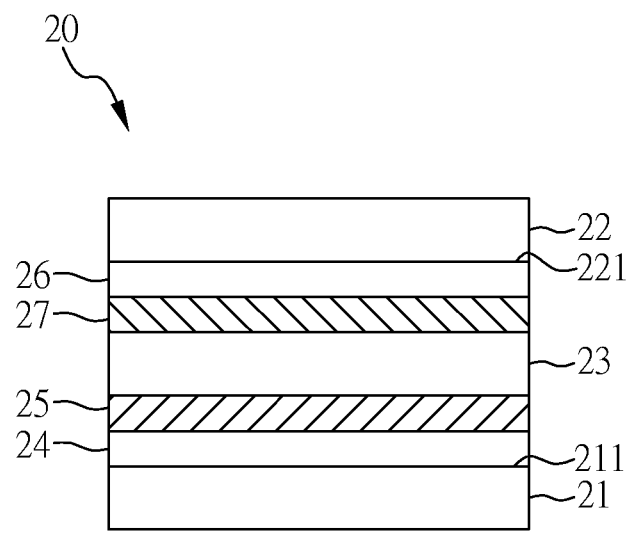
FIG. 5 is a schematic diagram of a viewing angle switchable panel according to an embodiment of the present disclosure.

FIG. 5 is a schematic diagram of a viewing angle switchable panel according to an embodiment of the present disclosure. In this embodiment, the structure of FIG. 5 is taken as an example, but the structure of the viewing angle switchable panel of the present disclosure is not limited thereto.

In one embodiment of the present disclosure, as shown in FIG. 5, the viewing angle switchable panel 20 may include a third substrate 21; a fourth substrate 22 disposed opposite to the third substrate 21; and a first insulating layer 24 disposed on the inner surface 211 of the third substrate 21; a first conductive layer 25 disposed on the first insulating layer 24; a second insulating layer 26 disposed on the inner surface 221 of the fourth substrate 22; a second conductive layer 27 disposed on the second insulating layer 26; and a switching medium layer 23 disposed between the first conductive layer 25 and the second conductive layer 27. In the present disclosure, although not shown in the figure, the viewing angle switchable panel 20 may include alignment films, which are respectively disposed on the first conductive layer 25 and the second conductive layer 27, and the alignment films are disposed adjacent to the switching medium layer 23. By applying voltage to the first conductive layer 25 and the second conductive layer 27, the switching medium layer 23 may be controlled, thereby adjusting the transparency of the viewing angle switchable panel 20, so that the viewing angle switchable panel 20 may achieve the functions of light transmitting, shielding, or privacy, thereby achieving the anti-peep effect of the electronic device.

In the present disclosure, the materials of the third substrate 21, the fourth substrate 22 and the switching medium layer 23 may be as described above, and will not be repeatedly described here. In the present disclosure, the same or different materials may be used to manufacture the first insulating layer 24 and the second insulating layer 26. The materials of the first insulating layer 24 and the second insulating layer 26 may include silicon oxide, silicon nitride, silicon oxynitride or a combination thereof, but the present disclosure is not limited thereto.

In the present disclosure, the same or different materials may be used to manufacture the first conductive layer 25 and the second conductive layer 27. The materials of the first conductive layer 25 and the second conductive layer 27 may include metals and metal oxides, alloys thereof or a combination thereof, such as gold, silver, copper, aluminum, chromium, platinum, indium zinc oxide (IZO), indium tin oxide (ITO), indium tin zinc oxide (ITZO), indium gallium zinc oxide (IGZO), aluminum zinc oxide (AZO), or a combination thereof, but the present disclosure is not limited thereto. In the present disclosure, the first conductive layer 25 and the second conductive layer 27 may be respectively disposed using a suitable method, such as electroplating, chemical plating, chemical vapor deposition, sputtering, or coating, but the present disclosure is not limited thereto.

Figure 6:
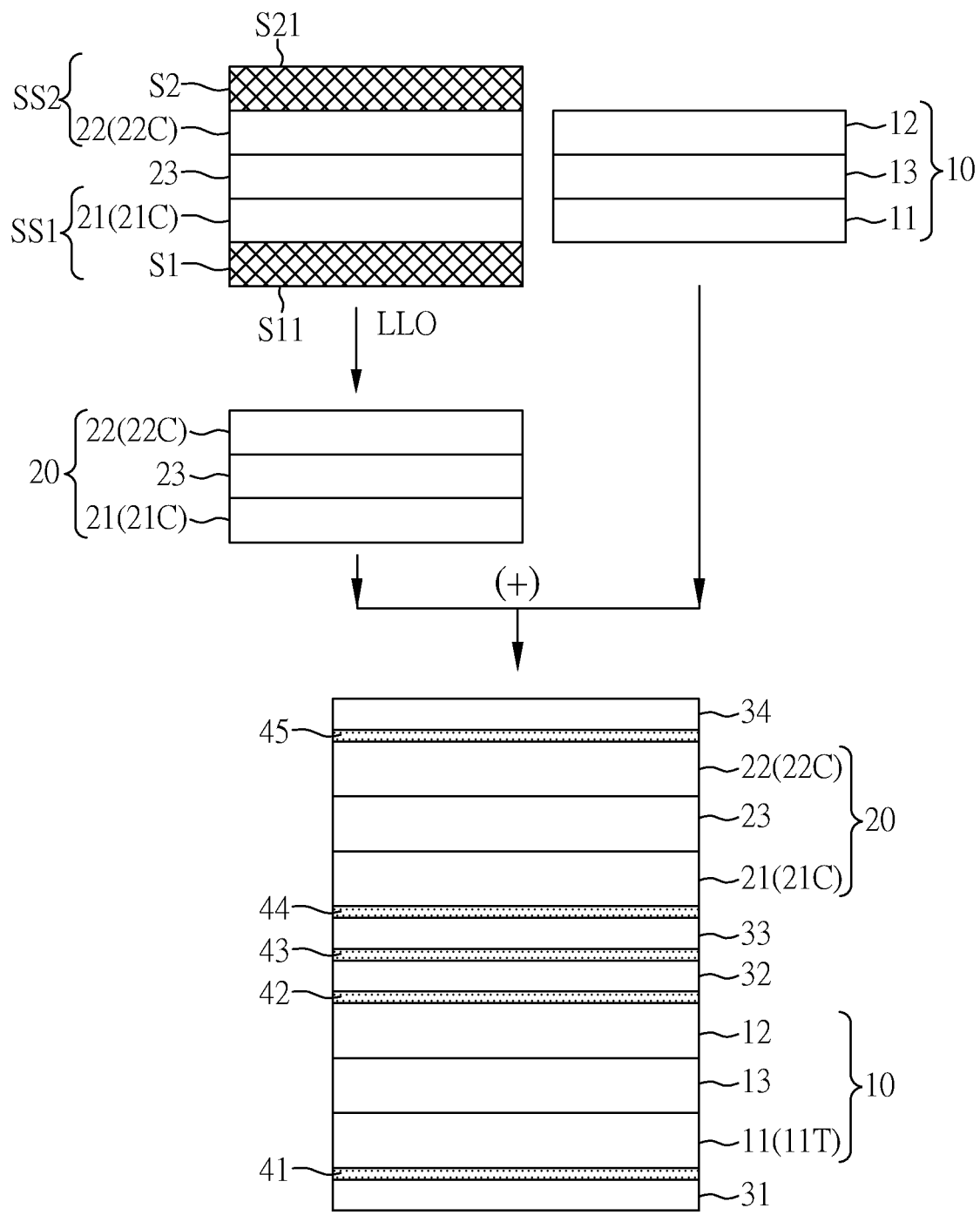
FIG. 6 is a schematic diagram of a manufacturing method of an electronic device according to an embodiment of the present disclosure.

FIG. 6 is a schematic diagram a manufacturing method of an electronic device according to an embodiment of the present disclosure.

In one embodiment of the present disclosure, as shown in FIG. 6, a manufacturing method of an electronic device may include the following steps. First, a display panel 10 and a viewing angle switchable panel 20 are respectively provided. The display panel 10 may include: a first substrate 11; a second substrate 12 disposed opposite to the first substrate 11; and a display medium layer 13 disposed between the first substrate 11 and the second substrate 12. The viewing angle switchable panel 20 may include: a third substrate 21; a fourth substrate 22 disposed opposite to the third substrate 21; and a switching medium layer 23 disposed between the third substrate 21 and the fourth substrate 22.

Next, the display panel 10 and the viewing angle switchable panel 20 are bonded together to form an electronic device. In this embodiment, the electronic device of FIG. 1 is taken as an example. In other embodiments of the present disclosure, the electronic device may also be as shown in FIG. 2 or FIG. 3, which will not be repeatedly described here.

In more detail, in this embodiment, as shown in FIG. 6, the viewing angle switchable panel 20 may be manufactured through the following steps. First, a first carrier substrate S1 and a second carrier substrate S2 are respectively provided. In the present disclosure, the first carrier substrate S1 and the second carrier substrate S2 may be hard substrates, flexible substrates or films, and the materials thereof may include quartz, glass, wafer, sapphire, soft-hard hybrid board, epoxy, polycarbonate (PC), polyimide (PI), polypropylene (PP), polyethylene terephthalate (PET) or other plastic materials, but the present disclosure is not limited thereto.

After that, the third substrate 21C is formed on the first carrier substrate S1 by a coating method to form a first substrate structure SS1, and the fourth substrate 22C is formed on the second carrier substrate S2 by a coating method to form a second substrate structure SS2. In the description of the present disclosure, a numeral followed by a mark of C (for example, 21C) may represent a film layer formed by the coating method. The thickness of at least one of the third substrate 21C and the fourth substrate 22C may be 5 µm to 50 µm, but the present disclosure is not limited thereto. Here, the materials of the third substrate 21C and the fourth substrate 22C may be as described above for the materials of the third substrate 21 and the fourth substrate 22, which will not be repeatedly described here. In addition, the coating method may be, for example, a dip coating method, a spin coating method, a roller coating method, a blade coating method, a spray coating method, or a combination thereof, but the present disclosure is not limited thereto. In one embodiment of the present disclosure, the thicknesses of the third substrate 21C and the fourth substrate 22C may each be 5 µm to 50 µm.

Next, the first substrate structure SS1 and the second substrate structure SS2 are combined correspondingly, and the switching medium layer 23 is formed between the third substrate 21C and the fourth substrate 22C, wherein the material of the switching medium layer 23 may be as described above, and will not be repeatedly described here.

Then, by using laser lift off (LLO) technology, the first carrier substrate S1 and the third substrate 21C in the first substrate structure SS1 are separated, and the second carrier substrate S2 and the fourth substrate 22C in the second substrate structure SS2 are separated, so as to form the viewing angle switchable panel 20. More specifically, the surface S11 of the first carrier substrate S1 away from the third substrate 21C may be irradiated with laser to form a peelable interface between the first carrier substrate S1 and the third substrate 21C, so that the first carrier substrate S1 is separated from the third substrate 21C. Similarly, the surface S21 of the second carrier substrate S2 away from the fourth substrate 22C may be irradiated with laser to form a peelable interface between the second carrier substrate S2 and the fourth substrate 22C, so that the second carrier substrate S2 is separated from the fourth substrate 22C. In the present disclosure, the wavelength, irradiation time, etc. of the laser are not particularly limited and may be adjusted as needed.

In the present disclosure, according to the requirement, one or more elements may be provided on the display panel 10 or the viewing angle switchable panel 20, or one or more elements may be provided between the display panel 10 and the viewing angle switchable panel 20, so as to provide the electronic device with one or more effects or functions. For example, before the step of bonding the display panel 10 and the viewing angle switchable panel 20, it may further include a step of disposing a polarizer (such as the second polarizer 32 and/or the third polarizer 33) on the display panel 10 and the viewing angle switchable panel 20. Alternatively, for example, before the step of bonding the display panel 10 and the viewing angle switchable panel 20, it may further include a step of disposing a polarizer (such as the first polarizer 31 and/or the fourth polarizer 34) on the display panel 10 or the viewing angle switchable panel 20. Alternatively, for example, after the step of bonding the display panel 10 and the switchable viewing angle panel 20, it may further include a step of disposing a touch sensing layer 52 on the viewing angle switchable panel 20 thereby forming the electronic device as shown in FIG. 3.

In the present disclosure, the display panel 10 or the viewing angle switchable panel 20 may be processed as needed to improve the electronic device. For example, before the step of bonding the display panel 10 and the viewing angle switchable panel 20, it may further include a step of thinning the first substrate 11 and/or the second substrate 12 by using substrate thinning technology, so that the electronic device may be further thinned or lightweight. For example, in FIG. 6, the thinned first substrate 11 may be marked as 11T as an example. The substrate thinning technology may be, for example, wet etching, with which the to-be-thinned substrate comes into touch an etching solution for being etched, so as to achieve the effect of substrate thinning, wherein a suitable etching solution may be, for example, hydrofluoric acid, but the present disclosure is not limited thereto.

Figure 7:
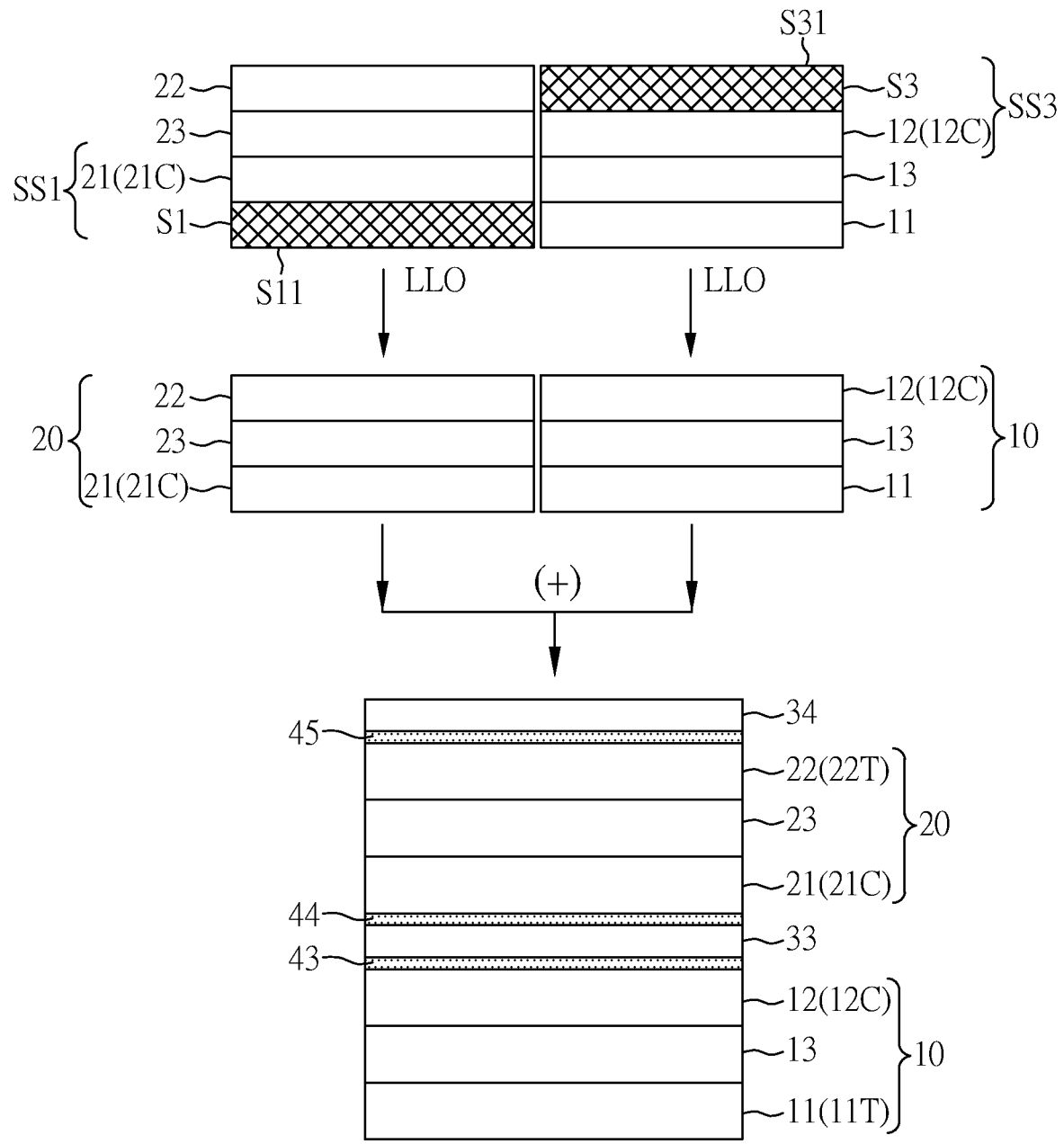
FIG. 7 is a schematic diagram of a manufacturing method of an electronic device according to another embodiment of the present disclosure.

FIG. 7 is a schematic diagram of a manufacturing method of an electronic device according to another embodiment of the present disclosure. The manufacturing method of FIG. 7 is similar to that of FIG. 6 except for the following differences.

In one embodiment of the present disclosure, as shown in FIG. 7, the viewing angle switchable panel 20 may be manufactured through the following steps. First, a first carrier substrate S1 is provided. Then, the third substrate 21C is formed on the first carrier substrate S1 by a coating method to form a first substrate structure SS1. Next, the first substrate structure SS1 and the fourth substrate 22 are combined correspondingly, and the switching medium layer 23 is formed between the third substrate 21C and the fourth substrate 22.

In this embodiment, the first carrier substrate S1, the third substrate 21C, the fourth substrate 22 and the switching medium layer 23 may be as described above, and will not be repeatedly described here. In addition, a suitable coating method may be, for example, dip coating, spin coating, roller coating, blade coating, spray coating, or a combination thereof, but the present disclosure is not limited thereto. In one embodiment of the present disclosure, the thickness of the third substrate 21C may be 5 µm to 50 µm. The thickness of the fourth substrate 22 may be greater than the thickness of the third substrate 21C. For example, the thickness of the fourth substrate 22 may be in the range of 100 µm to 10000 µm, such as 100 µm to 1000 µm.

Then, by using laser lift off technology, the first carrier substrate S1 and the third substrate in the first substrate structure SS1 are separated 21C to form the viewing angle switchable panel 20. More specifically, the surface S11 of the first carrier substrate S1 away from the third substrate 21C may be irradiated with laser to form a peelable interface between the first carrier substrate S1 and the third substrate 21C, so that the first carrier substrate S1 may be separated from the third substrate 21C. In the present disclosure, the wavelength, irradiation time, etc. of the laser are not particularly limited and may be adjusted as needed.

In one embodiment of the present disclosure, as shown in FIG. 7, the display panel 10 may be manufactured through the following steps. First, a third carrier substrate S3 is provided. Then, the second substrate 12C is formed on the third carrier substrate S3 by a coating method to form a third substrate structure SS3. Next, the third substrate structure SS3 and the first substrate 11 are combined correspondingly, and the display medium layer 13 is formed between the first substrate 11 and the second substrate 12C.

In this embodiment, the first substrate 11, the second substrate 12C and the display medium layer 13 may be as described above, and will not be repeatedly described here. The material of the third carrier substrate S3 may be as described for the first carrier substrate S1 and the second carrier substrate S2, and will not be repeatedly described here. In addition, a suitable coating method may be, for example, dip coating, spin coating, roller coating, blade coating, spray coating, or a combination thereof, but the present disclosure is not limited thereto. In one embodiment of the present disclosure, the thickness of the second substrate 12C may be 5 µm to 50 µm. The thickness of the first substrate 11 may be greater than the thickness of the second substrate 12C. For example, the thickness of the first substrate 11 may be in the range of 100 µm to 10000 µm, such as 100 µm to 1000 µm.

Then, by using laser lift off technology, the third carrier substrate S3 and the second substrate 12C in the third substrate structure SS3 are separated to form the display panel 10. More specifically, the surface S31 of the third carrier substrate S3 away from the second substrate 12C may be irradiated with laser to form a peelable interface between the third carrier substrate S3 and the second substrate 12C, so that the third carrier substrate S3 may be separated from the second substrate 12C. In the present disclosure, the wavelength, irradiation time, etc. of the laser are not particularly limited and may be adjusted as needed.

Next, the display panel 10 and the viewing angle switchable panel 20 are bonded together to form an electronic device. In this embodiment, the electronic device of FIG. 2 is taken as an example. In other embodiments of the present disclosure, the electronic device may be that shown in FIG. 1 or FIG. 3, and thus a detailed description is deemed unnecessary.

In the present disclosure, according to the requirement, one or more elements may be provided on the display panel 10 or the viewing angle switchable panel 20, or one or more elements may be provided between the display panel 10 and the viewing angle switchable panel 20, so as to provide the electronic device with one or more effects or functions. For example, before the step of bonding the display panel 10 and the viewing angle switchable panel 20, it may further include a step of disposing a polarizer (such as the third polarizer 33) between the display panel 10 and the viewing angle switchable panel 20. Alternatively, for example, before the step of bonding the display panel 10 and the viewing angle switchable panel 20, it may further include a step of disposing a polarizer (such as the fourth polarizer 34) on the viewing angle switchable panel 20. Alternatively, for example, after the step of bonding the display panel 10 and the viewing angle switchable panel 20, it may further include a step of disposing a touch sensing layer 52 (as shown in FIG. 3) on the viewing angle switchable panel 20, so as to form an electronic devices with touch functions.

In the present disclosure, the display panel 10 or the viewing angle switchable panel 20 may be processed as needed to improve the electronic device. For example, after the step of bonding the display panel 10 and the viewing angle switchable panel 20, it may further include a step of thinning the first substrate 11 and/or the fourth substrate 22 by using substrate thinning technology, so that the electronic device may be further thinned or lightweight. For example, in FIG. 7, the thinned first substrate 11 may be marked as 11T, and the thinned fourth substrate 22 may be marked as 22T. The substrate thinning technology may be wet etching, for example, but the present disclosure is not limited thereto.

According to some embodiments, a layer of substrate in the viewing angle switchable panel may be manufactured by a coating method to obtain a coated substrate with a thickness of 5 μm to 50 μm, while another substrate in the viewing angle switchable panel may be a thicker substrate. In this way, the viewing angle switchable panel still has support, which is convenient for transportation and is not prone to warping problems.

In summary, in the present disclosure, at least one substrate in the viewing angle switchable panel is manufactured by a coating method to obtain a thinner coated substrate. For example, the thickness of a substrate is within the range of 5 μm to 50 μm, thereby achieving the purpose of making the electronic devices thin or lightweight.

The aforementioned specific embodiments should be construed as merely illustrative, and not limiting the rest of the present disclosure in any way, and features of different embodiments may be mixed and matched as long as they do not conflict with each other.

The invention claimed is:

1. A manufacturing method of an electronic device, comprising the steps of:
   providing a display panel, in which the display panel includes a first substrate; a second substrate disposed opposite to the first substrate; and a display medium layer disposed between the first substrate and the second substrate;
   providing a viewing angle switchable panel, in which the viewing angle switchable panel includes a third substrate; a fourth substrate disposed opposite to the third substrate; and a switching medium layer disposed between the third substrate and the fourth substrate; and
   bonding the display panel and the viewing angle switchable panel together to form the electronic device,
   wherein at least one of the third substrate and the fourth substrate has a thickness of 5 μm to 50 μm,
   wherein the viewing angle switchable panel is manufactured through the steps of:
   providing a first carrier substrate;
   forming the third substrate on the first carrier substrate by a coating method so as to form a first substrate structure;
   combining the first substrate structure and the fourth substrate correspondingly, and forming the switching medium layer between the third substrate and the fourth substrate; and
   separating the first carrier substrate and the third substrate in the first substrate structure to form the viewing angle switchable panel;
   wherein the coating method includes dip coating, spin coating, roller coating, blade coating, spray coating, or a combination thereof.

2. The manufacturing method as claimed in claim 1, wherein the viewing angle switchable panel is manufactured through the steps of:
   providing the first carrier substrate and a second carrier substrate;
   forming the fourth substrate on the second carrier substrate by the coating method so as to form a second substrate structure;
   combining the first substrate structure and the second substrate structure correspondingly, and forming the switching medium layer between the third substrate and the fourth substrate; and
   separating the second carrier substrate and the fourth substrate in the second substrate structure to form the viewing angle switchable panel.

3. The manufacturing method as claimed in claim 2, wherein the second carrier substrate and the fourth substrate in the second substrate structure are separated by using laser lift off technology.

4. The manufacturing method as claimed in claim 3, wherein a surface of the second carrier substrate away from the fourth substrate is irradiated with laser to form a peelable interface between the second carrier substrate and the fourth substrate, so as to separate the second carrier substrate from the fourth substrate.

5. The manufacturing method as claimed in claim 1, wherein the display panel is manufactured through the steps of:
   providing a third carrier substrate;
   forming the second substrate on the third carrier substrate by the coating method so as to form a third substrate structure; and
   combining the third substrate structure and the first substrate correspondingly, and forming the display medium layer between the first substrate and the second substrate; and
   separating the third carrier substrate and the second substrate in the third substrate structure to form the display panel.

6. The manufacturing method as claimed in claim 5, wherein a thickness of the second substrate is 5 μm to 50 μm.

7. The manufacturing method as claimed in claim 5, wherein the third carrier substrate and the second substrate in the third substrate structure are separated by using laser lift off technology.

8. The manufacturing method as claimed in claim 7, wherein a surface of the third carrier substrate away from the second substrate is irradiated with laser to form a peelable interface between the third carrier substrate and the second substrate, so as to separate the third carrier substrate from the second substrate.

9. A manufacturing method of an electronic device, comprising the steps of:
   providing a display panel, in which the display panel includes a first substrate; a second substrate disposed opposite to the first substrate; and a display medium layer disposed between the first substrate and the second substrate;
   providing a viewing angle switchable panel, in which the viewing angle switchable panel includes a third substrate; a fourth substrate disposed opposite to the third substrate; and a switching medium layer disposed between the third substrate and the fourth substrate; and
   bonding the display panel and the viewing angle switchable panel together to form the electronic device,
   wherein at least one of the third substrate and the fourth substrate has a thickness of 5 μm to 50 μm,
   wherein the viewing angle switchable panel is manufactured through the steps of:
   providing a first carrier substrate;

forming the third substrate on the first carrier substrate by a coating method so as to form a first substrate structure;

combining the first substrate structure and the fourth substrate correspondingly, and forming the switching medium layer between the third substrate and the fourth substrate; and separating the first carrier substrate and the third substrate in the first substrate structure to form the viewing angle switchable panel, wherein the first carrier substrate and the third substrate in the first substrate structure are separated by using laser lift off technology.

10. The manufacturing method as claimed in claim 9, wherein a surface of the first carrier substrate away from the third substrate is irradiated with laser to form a peelable interface between the first carrier substrate and the third substrate, so as to separate the first carrier substrate from the third substrate.

11. The manufacturing method as claimed in claim 9, wherein the viewing angle switchable panel is manufactured through the steps of:

providing the first carrier substrate and a second carrier substrate;

forming the fourth substrate on the second carrier substrate by the coating method so as to form a second substrate structure;

combining the first substrate structure and the second substrate structure correspondingly, and forming the switching medium layer between the third substrate and the fourth substrate; and separating the second carrier substrate and the fourth substrate in the second substrate structure to form the viewing angle switchable panel.

12. The manufacturing method as claimed in claim 11, wherein the second carrier substrate and the fourth substrate in the second substrate structure are separated by using laser lift off technology.

13. The manufacturing method as claimed in claim 12, wherein a surface of the second carrier substrate away from the fourth substrate is irradiated with laser to form a peelable interface between the second carrier substrate and the fourth substrate, so as to separate the second carrier substrate from the fourth substrate.

14. The manufacturing method as claimed in claim 9, wherein the display panel is manufactured through the steps of:

providing a third carrier substrate;

forming the second substrate on the third carrier substrate by the coating method so as to form a third substrate structure; and combining the third substrate structure and the first substrate correspondingly, and forming the display medium layer between the first substrate and the second substrate; and separating the third carrier substrate and the second substrate in the third substrate structure to form the display panel.

15. The manufacturing method as claimed in claim 14, wherein a thickness of the second substrate is 5 μm to 50 μm.

16. The manufacturing method as claimed in claim 14, wherein the third carrier substrate and the second substrate in the third substrate structure are separated by using laser lift off technology.

17. The manufacturing method as claimed in claim 16, wherein a surface of the third carrier substrate away from the second substrate is irradiated with laser to form a peelable interface between the third carrier substrate and the second substrate, so as to separate the third carrier substrate from the second substrate.

\* \* \* \* \*